United States Patent [19]

Fleet et al.

[11] Patent Number: 5,358,290
[45] Date of Patent: Oct. 25, 1994

[54] RELEASE MECHANISM FOR USE WITH A VACUUM CLEANING HOSE

[75] Inventors: Ken Fleet, Waterloo; Keith McQuarrie, Kitchener; Anthony Tsui, St. Catherines, all of Canada

[73] Assignee: Iona Appliances Inc., Welland, Canada

[21] Appl. No.: 24,963

[22] Filed: Mar. 2, 1993

[51] Int. Cl.$^5$ .............................................. F16L 35/00
[52] U.S. Cl. ......................................... 285/7; 285/38; 285/320; 285/317
[58] Field of Search ................... 285/7, 320, 340, 308, 285/317, 38

[56] References Cited

U.S. PATENT DOCUMENTS

| | | | |
|---|---|---|---|
| 792,626 | 6/1905 | Stephens | 285/320 X |
| 1,056,197 | 3/1913 | McKee | 285/320 X |
| 3,049,367 | 8/1962 | Lashta | 285/7 |
| 3,744,824 | 7/1973 | Roos | 285/320 X |
| 4,508,369 | 4/1985 | Mode | 285/340 X |

FOREIGN PATENT DOCUMENTS

| | | | |
|---|---|---|---|
| 45901 | 1/1959 | Denmark | 285/7 |
| 571643 | 9/1945 | United Kingdom | 285/320 |

*Primary Examiner*—Dave W. Arola
*Attorney, Agent, or Firm*—Bereskin & Parr

[57] ABSTRACT

A release mechanism for use with vacuum cleaning appliances having a pipe and hose arrangement, where the pipe is slidably mounted inside the hose. The release mechanism comprises an inner sleeve, an outer sleeve and actuating buttons. The inner sleeve couples the pipe to the hose. By using the actuating buttons, the inner sleeve is operational in a closed position and an open position. In the closed position, the pipe can slide inside the hose, but it cannot be removed or detached from the hose. In the open position, the pipe can be removed or detached from the hose. The outer sleeve secures the release mechanism to the hose and houses the inner sleeve and actuating buttons.

9 Claims, 3 Drawing Sheets

RELEASE MECHANISM FOR USE WITH A VACUUM CLEANING HOSE

FIELD OF THE INVENTION

This invention relates to a device for use with a vacuum cleaning hose and pipe arrangement. More particularly, the device is a release mechanism for engaging and disengaging a pipe slidably mounted inside a flexible hose.

BACKGROUND OF THE INVENTION

Vacuum cleaners in use today typically are of the upright variety or the horizontal variety. The horizontal vacuum cleaners comprise a canister and vacuum chamber which is coupled to a cleaning attachment by a flexible hose. The cleaning attachment is pushed and pulled over the surface to be cleaned. In upright vacuum cleaners, the cleaning head and vacuum chamber are integrated as one unit. The upright vacuum includes a handle for pushing and pulling the vacuum over the surface to be cleaned.

To provide additional flexibility of operation, some upright vacuum cleaners are convertible. Such vacuum cleaners have a handle which comprises a flexible hose and rigid wand combination. The rigid wand slidably fits inside the flexible hose. In normal upright operation, the wand is locked to the vacuum chamber and provides a rigid handle for pushing and pulling the vacuum in the upright mode. To provide an easy handling vacuum attachment, the wand is disengageable from the vacuum chamber and a vacuum nozzle can be attached to the one end of the wand, for example to clean drapes. The wand and flexible hose arrangement can now be used in much the same manner as for a horizontal vacuum.

It will be appreciated that in some situations, the person using the vacuum appliance will want to remove the wand and just use the vacuum nozzle attached to the flexible hose. A known release mechanism comprises a cuff attached to the end of the flexible hose. The cuff keeps the wand in place by a friction fit. To detach the wand from the hose requires pulling or tugging the wand through the constriction of the cuff. While providing a secure attachment this arrangement suffers two principle drawbacks. First, it is clearly inconvenient to tug the wand through the constriction of the cuff. Secondly, and more importantly, repeated tugging to release the ward can damage the cuff/hose coupling, thereby requiring repair or replacement.

SUMMARY OF THE INVENTION

An object of the present invention to provide a release mechanism which allows the wand to be disengaged from the flexible hose with less effort and without stressing the hose and wand arrangement.

The present invention provides a device for coupling a pipe slidably mounted inside a hose, said device comprising; (a) means for retaining the pipe inside the hose; and (b) means for coupling said retaining means to one end of the hose.

BRIEF DESCRIPTION OF THE FIGURES

For a better understanding of the present invention in its various aspects, and to show more clearly how it may be carried into effect, reference will now be made by way of example, to the accompanying drawings which show a preferred embodiment of the present invention.

DETAILED DESCRIPTION OF THE PREFERRED EMBODIMENTS

Figure 1:
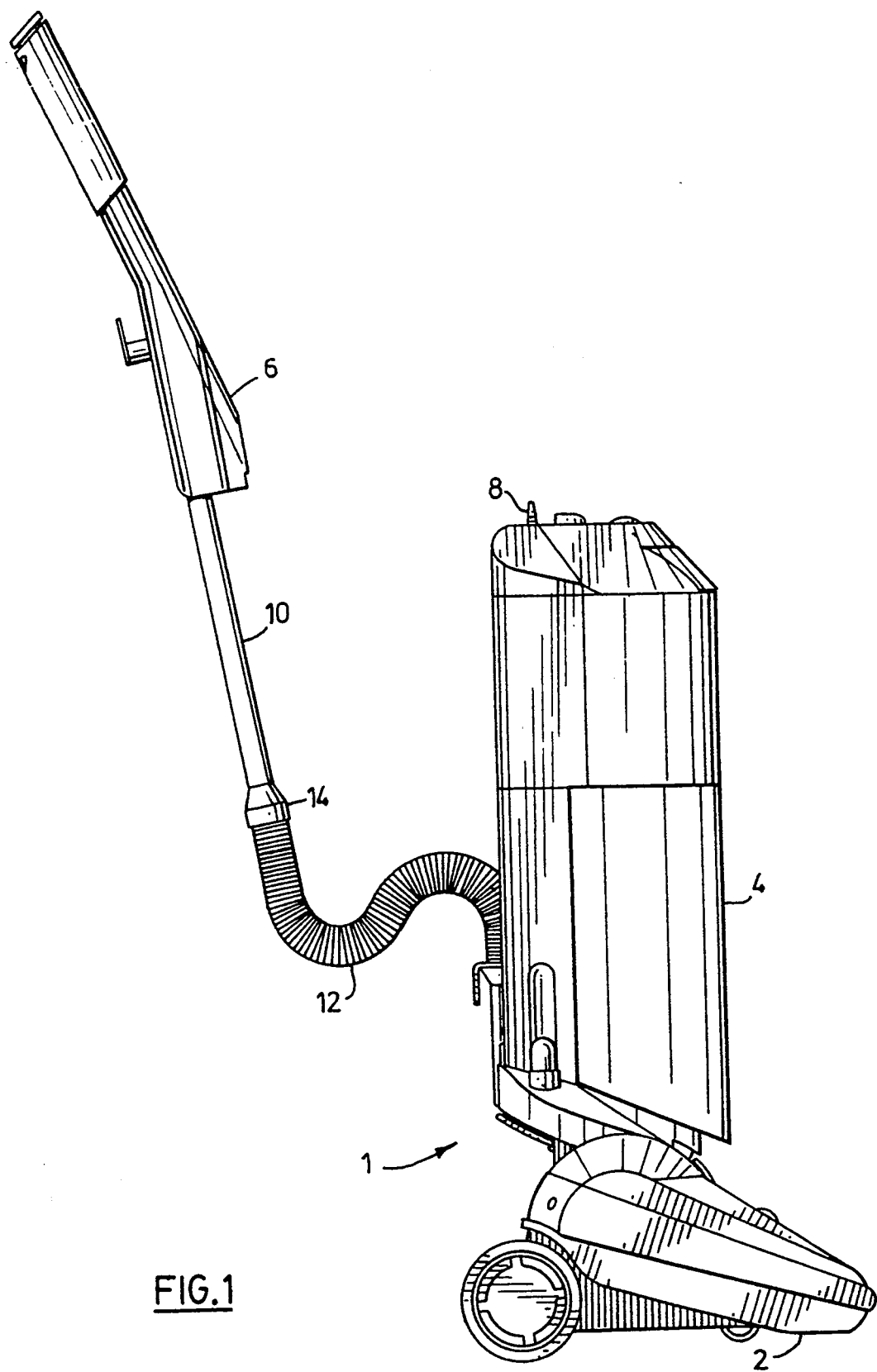
FIG. 1 shows a typical upright (convertible) vacuum cleaner which utilizes a release mechanism according to the present invention.

FIG. 1 shows a typical upright vacuum cleaner 1. The vacuum cleaner 1 comprises a cleaning head 2, a vacuum chamber 4, and a handle 6. The cleaning head 2 includes a suction chamber (not shown) which provides the vacuum suction. For upright vacuuming, i.e. using the handle 6 to push and pull the vacuum 1 in an upright position, the handle 6 is rigidly secured (not shown) to the top of the vacuum chamber 4 using a latch mechanism 8.

A feature of the vacuum cleaner 1 is that the handle 6 can be detached from the vacuum chamber 4 to provide a flexible cleaning head which can be hand-held. In other words, the handle 6 can be converted to a hand-held vacuum nozzle. The handle 6 can be detached from the top of the chamber 4 by releasing the latch mechanism 8.

In FIG. 1, the handle 6 is shown in the detached or convertible mode. In known manner, the handle 6 is coupled to the cleaning head 2 (and suction chamber (not shown)) by a rigid wand or pipe 10 which fits inside a flexible hose 12. The flexible hose 12 is sized slightly larger than the pipe 10 so that the pipe 10 can slide easily within the flexible hose 12. The flexible hose 12 is secured at one end to the cleaning head 2. In the upright mode of operation, the wand or pipe 10 is slid inside the flexible hose 12 and the handle 6 is secured to the vacuum chamber 4 by the latch mechanism 8. The lower end of the pipe 10 can also include a flange which can be engaged by the cleaning head 2, in known manner.

In some upright convertible vacuum designs, it may be desirable to integrate the cleaning nozzle attachment with the handle 6. In other designs, it may be desirable to permit various types of cleaning attachments to be used with the detached handle/hose 6, 12 arrangement. To provide this adaptability, the pipe 10 is coupled to the flexible hose 12 by a releasable coupler 14 according to the present invention. The releasable coupler 14 allows the pipe 10 to be detached or removed from the flexible hose 12. Various cleaning attachments or vacuuming accessories (not shown) may then be attached directly to the flexible hose 12. This permits the use of interchangeable cleaning attachments or accessories (not shown) with the flexible hose 12.

Figures 2, 3:
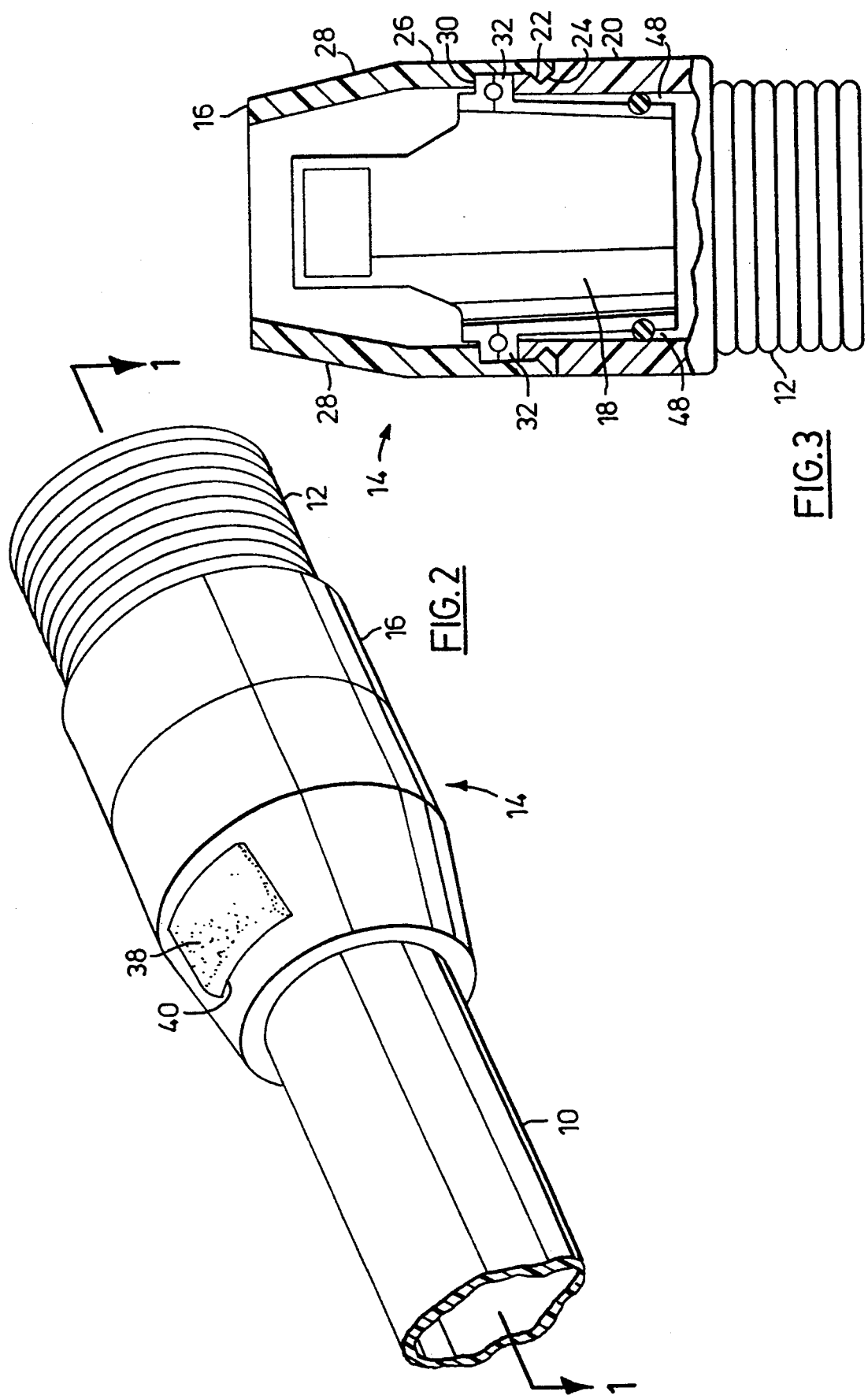
FIG. 2 shows a perspective view of the release mechanism according to the preferred embodiment of the present invention and a wand and flexible hose, with the hose being partially cut away.
FIG. 3 is a cross-sectional view of the release mechanism of FIG. 2 along line 1—1.

FIG. 2 shows a close-up view of the releasable coupler 14 according to the present invention. One end of the coupler 14 is connected to the flexible hose 12, while the other end of the coupler 14 permits the pipe 10 to slide within flexible hose 12. As will be explained in detail below, the releasable coupler 14 can be operated in an engaged position and in a release position. In the engaged position, the coupler 14 prevents the pipe 10 from being removed or detached from the flexible hose 12. In the release position, however, the pipe 10 can be completed removed from the flexible hose 12.

In describing the details of the releasable coupler 14 according to the present invention, reference will be made to FIG. 2 and to FIGS. 3 and 4 in which corresponding references indicate corresponding elements. The releasable coupler 14 comprises an outer sleeve or cuff 16 and an inner sleeve 18. The outer sleeve 16 forms the housing for the releasable coupler 14 and also secures the coupler 14 to the flexible hose 12.

As shown in FIG. 3, the flexible hose 12 includes a cuff 20 which has a lip 22 and a groove 24 for securing to the coupler 14.

The outer sleeve 16 comprises respective lower and upper sections 26 and 28. The lower section 26 forms the base of the outer sleeve 16 and includes a groove 30 which mates and engages the lip 22 on the cuff 20 thereby securing the coupler 14 to the flexible hose 12. The groove 24 also helps secure the inner sleeve 18. As shown in FIG. 3, the inner sleeve 18 has a flange 32 which runs around its perimeter. The groove 24 is wide enough to accommodate both the lip 22 and the flange 32, with the flange 32 being seated in the groove 24 above the lip 22. The upper section 28 of the outer sleeve 16 has a frusto-conical shape as will be discussed below.

Figure 5:
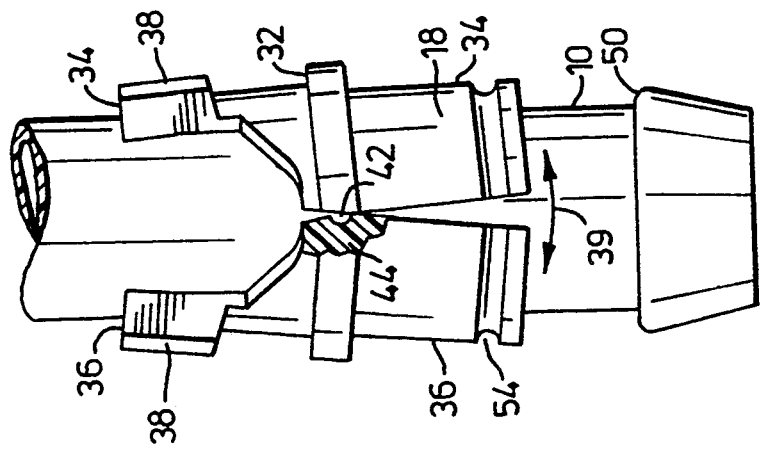
FIG. 5 is a side view of the release mechanism of FIG. 2 in the engaged or closed position with the cuff removed.
Figure 4:
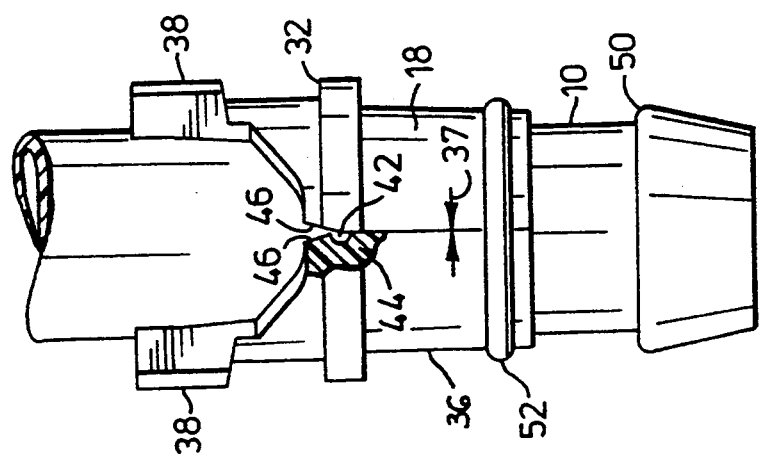
FIG. 4 is a side view of the release mechanism of FIG. 2 in the disengaged or open position with the cuff removed.

The inner sleeve 18 comprises first and second half sections 34, 36 as shown in FIG. 4. The half sections 34, 36 are identical to each other. The two half sections 34, 36 form a cylindrical sleeve when the sections 34, 36 are in an engaged or closed position as indicated by arrow 37 in FIG. 4. The half sections each include a button 38 for biasing the coupler 14 into an open or release position as indicated by arrow 39 in FIG. 5. The buttons 38 protrude through a pair of apertures 40 in the cuff 16 (FIG. 2). Each half section 34, 36 also includes complementary position locators, which in the preferred embodiment comprise a pin 42 and a socket 44 (FIGS. 4 and 5). The pin 42 in one half section 34 lines up with the socket 44 in the other half section 36, as shown in the cut-away portion of FIGS. 4 and 5.

The pin 42 and socket 44 also provide a pivotal coupling to allow the inner sleeve 18 to move between the closed position 37 (FIG. 4) and open position 39 (FIG. 5). The pivotal coupling occurs between the first and second half sections 34, 36, as follows. The pivotal coupling comprises the pin 42 and socket 44 arrangement and corresponding rocker cutouts 46 (FIG. 4) just above the flange 32 on each of the half sections 34, 36. As will be appreciated by one skilled in the art, the pin 42 and socket 44 arrangement provides a pivot or hinge point allowing the half sections 34, 36 to open when the buttons 38 are depressed as shown in FIG. 5. The rocker cutouts 46 determine how far the half sections 34, 36 can open in conjunction with the inside diameter of the cuff 16. In addition, as shown in FIG. 2, the inner sleeve 18 includes a taper to give some clearance 48 between the bottom portions of the half sections 34, 36 and the inside of the cuff 16, thereby accommodating the pivotal movement between the half sections 34, 36.

In the release position 39 (FIG. 5), the half sections 34, 36 spread away from the pipe 10 thereby allowing the pipe 10 to move freely relative to the flexible hose 12 and the coupler 14. The rigid pipe 14 typically has a flange 50 (FIG. 4) which is used to secure the pipe/hose assembly 10, 12 to the cleaning head 2 when the vacuum 1 is being used in the upright mode. As can be seen in FIG. 4, the flange 50 will abut against the bottom edge of the inner sleeve 18 and the coupler 14 prevents the removal of the pipe 10 from inside the hose 12. Conversely, in the open or release position 39, the bottom edge of the inner sleeve 18 opens to a diameter slightly greater than the flange 50 on the pipe 10. Depressing the buttons 38 causes the half sections 34, 36 to spread thereby allowing the pipe 10 to be removed from the flexible hose 12.

Referring to FIG. 4, a rubber "O-ring" 52 biases the inner sleeve 18 into the closed position 37. The O-ring 52 sits in a groove 54 located above the bottom edge of the sleeve 18 (FIG. 5). The buttons 38, in cooperation with the pin 42 and socket 44 arrangement, provide a cantilever which expands the O-ring 52 when the buttons 38 are depressed, thereby allowing the half sections 34, 36 to spread to the open or release position 39. When the buttons 38 are released the tension in the O-ring 52 causes the half sections 34, 36 to snap back to the closed position 37.

The tension in the O-ring 52 can opposed by a force generated by the outer sleeve 16, and more specifically the second section 28. As mentioned above, the second section 28 has a frustoconical shape (FIGS. 2 and 3). This frusto-conical shape of the upper section 28 of the outer sleeve 16 tends to constrict the half sections 34, 36. By making the outer sleeve 16 from a rubber or elastic material, the sleeve 16 forces the half sections 34, 36 into the open or release position 39 (FIG. 5), but is counteracted by the force of the O-ring 52 and the inside diameter of the lower section 26 of the outer sleeve 16.

In known manner, the half sections 34, 36 comprising the inner sleeve 18 can be made using injection molding techniques. The outer sleeve or cuff 16, in the preferred embodiment, is made from a rubber material. The "O-ring" 52 can be made from a durable elastic material.

In another embodiment of the present invention, the diameter of the inner sleeve 18 can be dimensioned so that in the closed position there is a tighter fit between the sleeve 18 and the pipe 10. The purpose of the tighter fit is to allow the pipe 10 to be partially extended from the hose 12 and supported by the inner sleeve 18. It will be appreciated that the inside diameter of the inner sleeve 18 must still be such that the pipe 10 can be completely removed when the sleeve 18 is in the release position 39, i.e. the flange 50 will have to be sized to clear the inner sleeve 18 in the open or release position 39.

It will be evident to those skilled in the art that other embodiments of the invention fall within its spirit and scope as defined by the following claims.

We claim:

1. A device for coupling a pipe slidably mounted inside a hose, said device comprising:
   (a) means for retaining the pipe inside the hose; and
   (b) means for coupling said retaining means to one end of the hose;
   (c) said means for retaining having actuating means for pivotally moving said retaining means between an open position and a closed position, in said closed position said retaining means preventing the pipe from being removed from the hose, and in said open position said retaining means allowing the pipe to be removed from the hose.

2. The device as claimed in claim 1, wherein said means for retaining comprises an inner sleeve, in said closed position said inner sleeve surrounds the pipe and forms a stopping edge which prevents the pipe from being removed from the hose.

3. The device as claimed in claim 2, wherein said inner sleeve comprises first and second half sections, said first and second half sections having positioning means for mating said first and second half sections to form a substantially cylindrical shape having said stopping edge formed at one end when in said closed position, and said first and second half sections including pivotal coupling means and said actuating means being coupled to said pivotal coupling means so that said inner sleeve can operate in the closed position and in the open position.

4. The device as claimed in claim 3, wherein said means for retaining includes means for biasing said retaining means in the closed position, said means for biasing being coupled to said first and second half sections.

5. The device as claimed in claim 4, wherein said actuating means comprises first and second actuator members, said actuator members being connected to the end of said first and second half sections opposite the end having said stopping edge and said actuating members operating in cooperation with said pivotal coupling means to move said inner sleeve into said open position.

6. The device as claimed in claim 5, wherein said means for coupling comprises a cuff, said cuff including means for attaching to one end of the hose and receiving said means for coupling so that said coupling means are secured to the flexible hose.

7. The device as claimed in claim 6, wherein said means for biasing comprises a tension ring positioned on the end of said inner sleeve having said stopping edge.

8. A device for coupling a pipe slidably mounted inside a hose for use with a vacuum cleaning appliance, said device comprising:
(a) an inner sleeve, said inner sleeve having a recess for slidably accepting the pipe;
(b) said inner sleeve comprising first and second sections, said first and second sections including positioning means for mating said first and second sections to form a substantially cylindrical shape;
(c) said positioning means including means for providing a pivotal coupling between said first and second sections and allowing said inner sleeve to move between an open position and a closed position;
(d) means for biasing said first and second sections in the closed position;
(e) actuating means for moving said inner sleeve to the open position, said actuating means including first and second actuator members, said first actuator member being connected to said first section and said second actuator member being connected to said second section of said inner sleeve; and
(f) a cuff, said cuff including means for attaching to the hose and means for attaching to said inner sleeve.

9. The device as claimed in claim 8, wherein said actuating members each include a button for receiving a manually applied force and moving said inner sleeve to the open position in response thereto.

* * * * *